(12) United States Patent
Mizobata et al.

(10) Patent No.: US 10,569,679 B2
(45) Date of Patent: Feb. 25, 2020

(54) BACK FRAME STRUCTURE FOR VEHICLE SEAT

(71) Applicant: TOYOTA BOSHOKU KABUSHIKI KAISHA, Aichi-ken (JP)

(72) Inventors: Hiroshi Mizobata, Aichi-ken (JP); Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 199 days.

(21) Appl. No.: 15/598,507

(22) Filed: May 18, 2017

(65) Prior Publication Data

US 2017/0341552 A1 Nov. 30, 2017

(51) Int. Cl.
*B60N 2/68* (2006.01)
*B60R 22/18* (2006.01)
*B60R 22/26* (2006.01)

(52) U.S. Cl.
CPC ............... *B60N 2/68* (2013.01); *B60R 22/18* (2013.01); *B60R 22/26* (2013.01); *B60R 2022/1818* (2013.01)

(58) Field of Classification Search
CPC .......... B60N 2/68; B60N 22/18; B60N 22/26; B60N 2022/1818
See application file for complete search history.

(56) References Cited

U.S. PATENT DOCUMENTS

| | | | | |
|---|---|---|---|---|
| 5,626,396 A * | 5/1997 | Kuragano | ................ | B60N 2/68 297/391 |
| 5,671,976 A * | 9/1997 | Fredrick | ................ | B60N 2/682 297/284.1 |
| 6,817,672 B2 * | 11/2004 | Matsunuma | ........... | B60N 2/682 297/452.18 |
| 7,066,552 B2 * | 6/2006 | Yoshida | .................... | B60N 2/64 297/452.18 |
| 8,888,176 B2 * | 11/2014 | Kaku | ................... | B60N 2/4235 297/216.13 |
| 8,888,177 B2 * | 11/2014 | Kaku | ................... | B60N 2/4235 297/216.13 |
| 8,888,191 B2 * | 11/2014 | Hosokawa | ............... | B60N 2/22 297/452.18 |
| 9,211,819 B2 * | 12/2015 | Nitsuma | ............. | B60N 2/4228 |
| 2006/0273649 A1 * | 12/2006 | Saberan | ................ | B60N 2/888 297/452.18 |

(Continued)

FOREIGN PATENT DOCUMENTS

JP 2014-156212 8/2014

*Primary Examiner* — James M Ference
(74) *Attorney, Agent, or Firm* — Greenblum & Bernstein, PLC

(57) ABSTRACT

A back frame structure for a vehicle seat includes: a pair of right and left side frames extending in an up-down direction; and a lower frame configured to connect a lower end side of the right side frame and a lower end side of the left side frame, wherein: at least one side frame out of the pair of right and left side frames is fitted to one connection portion, which is a connection portion of the lower frame with respect to the one side frame, so as to form one fitting portion; and the one fitting portion is configured such that a geometrical-moment of inertia along an axis extending to a predetermined first direction gradually increases from an upper part of the one fitting portion to a lower part of the one fitting portion.

12 Claims, 12 Drawing Sheets

(56) References Cited

U.S. PATENT DOCUMENTS

| | | | |
|---|---|---|---|
| 2008/0296271 A1* | 12/2008 | Klein | B23K 26/123 219/121.64 |
| 2010/0181816 A1* | 7/2010 | Kienke | B23K 33/00 297/362 |
| 2010/0259089 A1* | 10/2010 | Mizobata | B60N 2/7011 297/452.56 |
| 2011/0163587 A1* | 7/2011 | Kmeid | B60N 2/68 297/452.2 |
| 2011/0298268 A1* | 12/2011 | Mizobata | B60N 2/682 297/452.18 |
| 2012/0139315 A1* | 6/2012 | Yamada | B60N 2/22 297/354.1 |
| 2012/0193954 A1* | 8/2012 | Sakkinen | B60N 2/4235 297/216.13 |
| 2012/0223563 A1* | 9/2012 | Zimmermann | B60N 2/682 297/391 |
| 2012/0306253 A1* | 12/2012 | Seibold | B60N 2/68 297/354.1 |
| 2013/0119737 A1* | 5/2013 | Mizobata | B60N 2/888 297/408 |
| 2013/0140868 A1* | 6/2013 | Muck | B23K 26/24 297/452.2 |
| 2013/0187417 A1* | 7/2013 | Seo | B60N 2/68 297/216.13 |
| 2014/0159462 A1* | 6/2014 | Matsumoto | B60N 2/68 297/452.18 |
| 2014/0232162 A1* | 8/2014 | Mitsuhashi | B60N 2/68 297/452.18 |
| 2014/0375099 A1* | 12/2014 | Kitou | B60N 2/682 297/391 |
| 2014/0375106 A1* | 12/2014 | Yamada | B60N 2/682 297/452.18 |
| 2015/0197174 A1* | 7/2015 | Akutsu | B60N 2/5825 297/452.18 |
| 2015/0202998 A1* | 7/2015 | Komatsubara | B60N 2/68 297/216.1 |
| 2015/0336528 A1* | 11/2015 | Tanabe | B60R 21/207 280/728.2 |
| 2016/0001689 A1* | 1/2016 | Yasuda | B60N 2/80 297/391 |
| 2016/0009207 A1* | 1/2016 | Kuroda | B60N 2/80 297/180.14 |
| 2016/0009210 A1* | 1/2016 | Sasaki | B60N 2/5657 297/180.13 |
| 2017/0341552 A1* | 11/2017 | Mizobata | B60N 2/68 |
| 2017/0341553 A1* | 11/2017 | Mizobata | B60N 2/68 |

* cited by examiner

BACK FRAME STRUCTURE FOR VEHICLE SEAT

INCORPORATION BY REFERENCE

The disclosure of Japanese Patent Application No. 2016-104019 filed on May 25, 2016 including the specification, drawings and abstract is incorporated herein by reference in its entirety.

BACKGROUND

1. Technical Field

The disclosure relates to a back frame structure for a vehicle seat to be provided in vehicles such as an automobile, an airplane, a ship, and a train.

2. Description of Related Art

As one of back frame structures for a vehicle seat, there is such a back frame structure in which a gate-shaped back frame having a generally reverse U-shape in a front view and serving as a framework of a seatback is formed such that upper end sides of a pair of side frames extending in an up-down direction are connected by an upper frame in a bridged manner. A back frame of this type as described in Japanese Patent Application Publication No. 2014-156212 (JP 2014-156212 A) is a back frame for a vehicle seat with a built-in three point seat belt. In the back frame structure of JP 2014-156212 A, an upper end of a high-strength side frame is connected to an upper end of a normal-strength side frame by an upper frame. The high-strength side frame is on a side where a load from a webbing of a seat belt system is directly applied and the normal-strength side frame is on the other side. A webbing guide is attached to the upper end of the high-strength side frame. Further, a lower end side of the high-strength side frame is connected to a lower end side of the normal-strength side frame by a lower pipe in a bridged manner. The webbing guide is a member configured to guide a webbing let out from a webbing winding apparatus disposed inside the seatback so as to extend from a back-face side of the back frame toward a front-face side thereof.

SUMMARY

In the above structure, the back frame has the generally reverse U-shaped gate shape in a front view, and the lower pipe connects the lower end side of the high-strength side frame to the lower end side of the normal-strength side frame and functions to restrain inclination of the back frame in a right-left direction. However, the lower pipe does not have a function to increase bending rigidity in a front-rear direction and bending rigidity in the right-left direction in terms of the high-strength side frame and/or the normal-strength side frame. This makes it difficult to reduce the size of an outline shape of a cross section of the high-strength side frame and/or a cross section of the normal-strength side frame. This also makes it difficult to reduce a thickness of a constituent component so as to reduce the weight. In view of this, a structure that can increase the bending rigidity in the front-rear direction and the bending rigidity in the right-left direction in terms of the high-strength side frame and/or the normal-strength side frame by a lower frame corresponding to a lower pipe has been desired.

In view of such problems, an object of the disclosure is to provide a structure that can increase the bending rigidity of right and left side frames by a lower frame connecting lower end sides of the side frames, in terms of a back frame structure for a vehicle seat.

A back frame structure for a vehicle seat, according to one aspect of the disclosure, includes: a pair of right and left side frames extending in an up-down direction; and a lower frame configured to connect a lower end side of the right side frame and a lower end side of the left side frame, wherein: at least one side frame out of the pair of right and left side frames is fitted to one connection portion, which is a connection portion of the lower frame with respect to the one side frame, so as to form one fitting portion; and the one fitting portion is configured such that a geometrical-moment of inertia along an axis extending to a predetermined first direction gradually increases from an upper part of the one fitting portion to a lower part of the one fitting portion.

According to the above aspect, the lower end side of the one side frame is connected to the connection portion of the lower frame. In a part where the one side frame is connected to the one connection portion of the lower frame, the geometrical-moment of inertia along the axis extending in the first direction gradually increases from the upper part of the one side frame to the lower part thereof. Since the lower end side of the one side frame is connected to a cushion frame, when the geometrical-moment of inertia gradually increases from the upper part to the lower part, the bending rigidity is increased effectively. That is, by connecting the lower frame to the one side frame, it is possible to increase the bending rigidity of the one side frame in a direction perpendicular to the first direction.

The first direction may be a right-left direction. A section obtained by cutting the one fitting portion along a horizontal plane may be referred to as one fitting section, and a length of an outline of the one fitting section in a front-rear direction may gradually increase from the upper part of the one fitting portion to the lower part of the one fitting portion.

According to the above aspect, the length of the outline of the one fitting section in the front-rear direction gradually increases from the upper part of the one fitting portion to the lower part thereof. Accordingly, in the part where the one side frame is connected to the one connection portion of the lower frame, the geometrical-moment of inertia along the axis extending in the right-left direction gradually increases from the upper part to the lower part. Accordingly, it is possible to increase the bending rigidity of the one side frame in the front-rear direction by connecting the lower frame to the one side frame.

A height of the lower frame in the up-down direction may be formed so as to gradually decrease from the one connection portion toward a central part of the back frame in the right-left direction.

According to the above aspect, the height of the lower frame in the up-down direction is formed so as to gradually decrease from the one connection portion on the lower end side of the one side frame toward the central part of the back frame in the right-left direction. Hereby, the geometrical-moment of inertia along an axis of the lower frame, extending in the front-rear direction, gradually increases downward from an upper end of a part where the one side frame is connected to the one connection portion of the lower frame. That is, the bending rigidity of the one side frame in the right-left direction can be increased while the size of the lower frame is made small to reduce the weight.

The other side frame out of the pair of right and left side frames may be fitted to the other connection portion, which is a connection portion of the lower frame with respect to the other side frame, so as to form the other fitting portion. The one side frame and the other side frame may be configured such that their cross sections are uniform closed sections or rear open sections having a generally U-shape that is opened rearward. The connection portion of the lower frame with respect to the one side frame may be referred to as one connection portion, the connection portion of the lower frame with respect to the other side frame may be referred to as the other connection portion, and the one connection portion and the other connection portion may configured as front open sections having a generally U-shape that is opened forward. The front open sections may form the one fitting portion and the other fitting portion with respect to the closed sections or the rear open sections over a predetermined length in the up-down direction. A section obtained by cutting the other fitting portion along a horizontal plane may be referred to as the other fitting section, and a length of an outline of the other fitting section in the front-rear direction may be formed to gradually increase from an upper part of the other fitting portion to a lower part thereof. A height of the lower frame in the up-down direction may be formed to gradually decrease from the one connection portion and the other connection portion toward the central part of the back frame in the right-left direction.

According to the above aspect, since the pair of right and left side frames are both connected to the lower frame, the bending rigidity of the pair of right and left side frames in the front-rear direction and the bending rigidity of the pair of right and left side frames in the right-left direction can be increased.

An upper arm having a rigidity higher than that of the one side frame may be attached to a lower end of the one side frame. An upper arm having a rigidity higher than that of the other side frame may be also attached to a lower end of the other side frame. The one connection portion of the lower frame may be disposed over the one side frame and the upper arm. The other connection portion of the lower frame may be also disposed over the other side frame and the upper arm.

According to the above aspect, the one connection portion is disposed over the one side frame and the upper arm, or the other connection portion is disposed over the other side frame and the upper arm. This makes it possible to achieve a continuous change of the geometrical-moment of inertia between the high-rigidity upper arm and the one side frame or between the high-rigidity upper arm and the other side frame by relaxing a discontinuous change in the geometrical-moment of inertia thereof. This accordingly makes it possible to increase the bending rigidity while avoiding a local concentration of stress at the time when a force in the front-rear direction is applied to the back frame.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
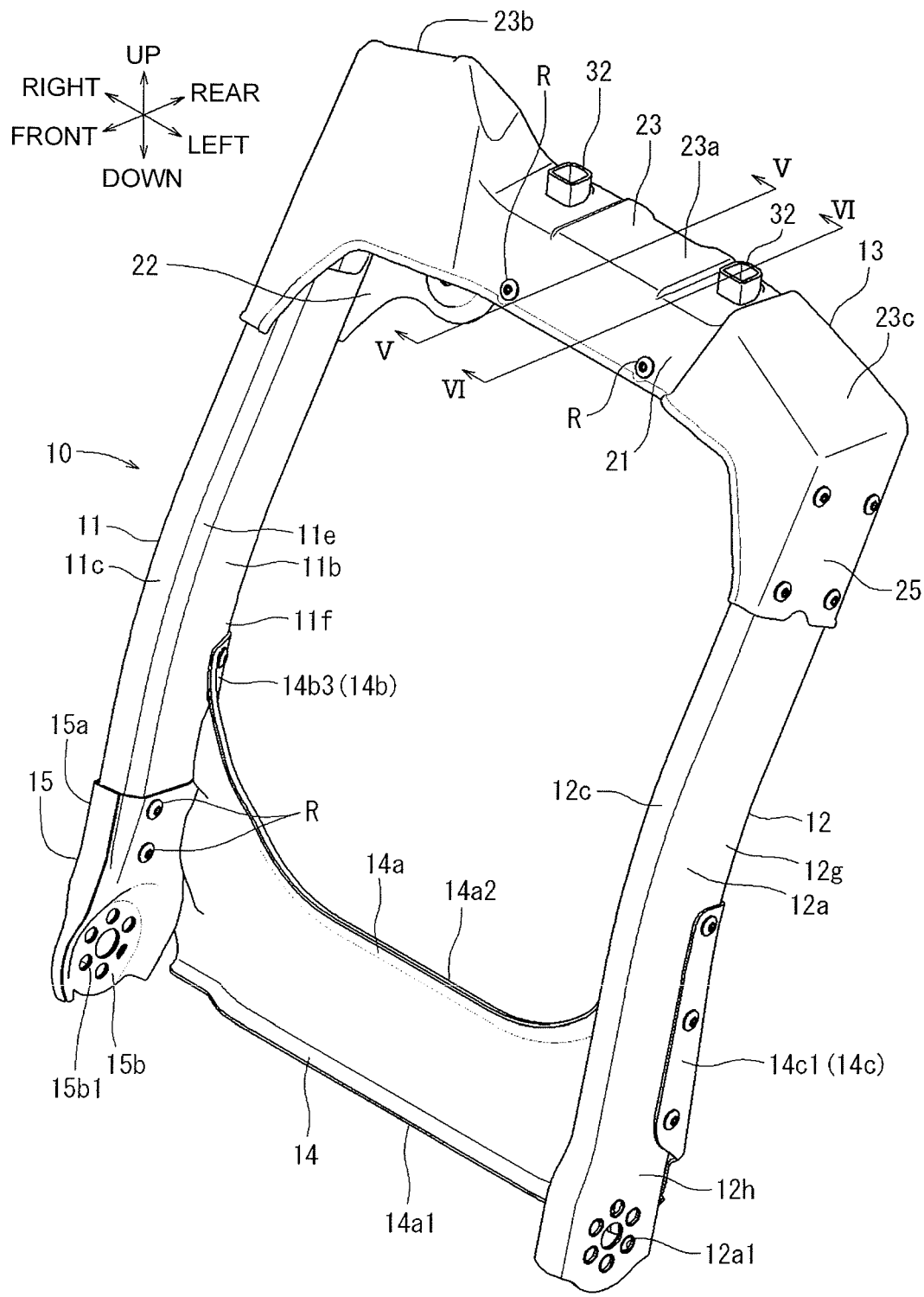
FIG. 1 is a perspective view of a back frame for a right automobile seat according to one embodiment of the disclosure.

FIG. 1 to FIG. 13 illustrate one embodiment of the disclosure. The present embodiment is an example in which the disclosure is applied a back frame (hereinafter just referred to as the back frame) for an automobile seat. In the drawings, respective arrows indicate respective directions of an automobile and an automobile seat at the time when the automobile seat is attached to a floor of the automobile. The back frame is attached to the automobile seat. In the following description, a description about a direction shall be performed on the basis of these directions.

Figure 2:
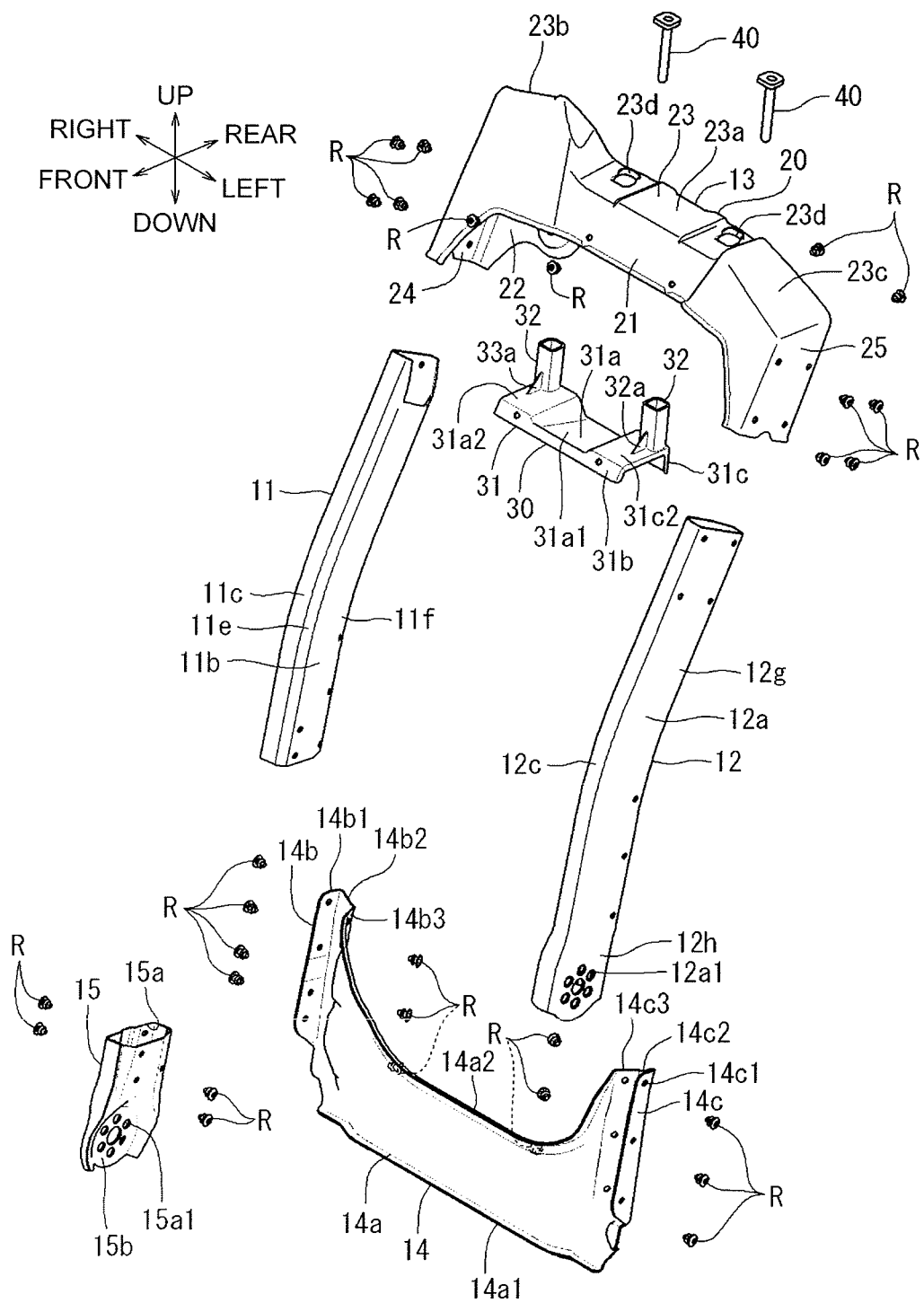
FIG. 2 is an exploded perspective view of the back frame of the above embodiment.
Figure 3:
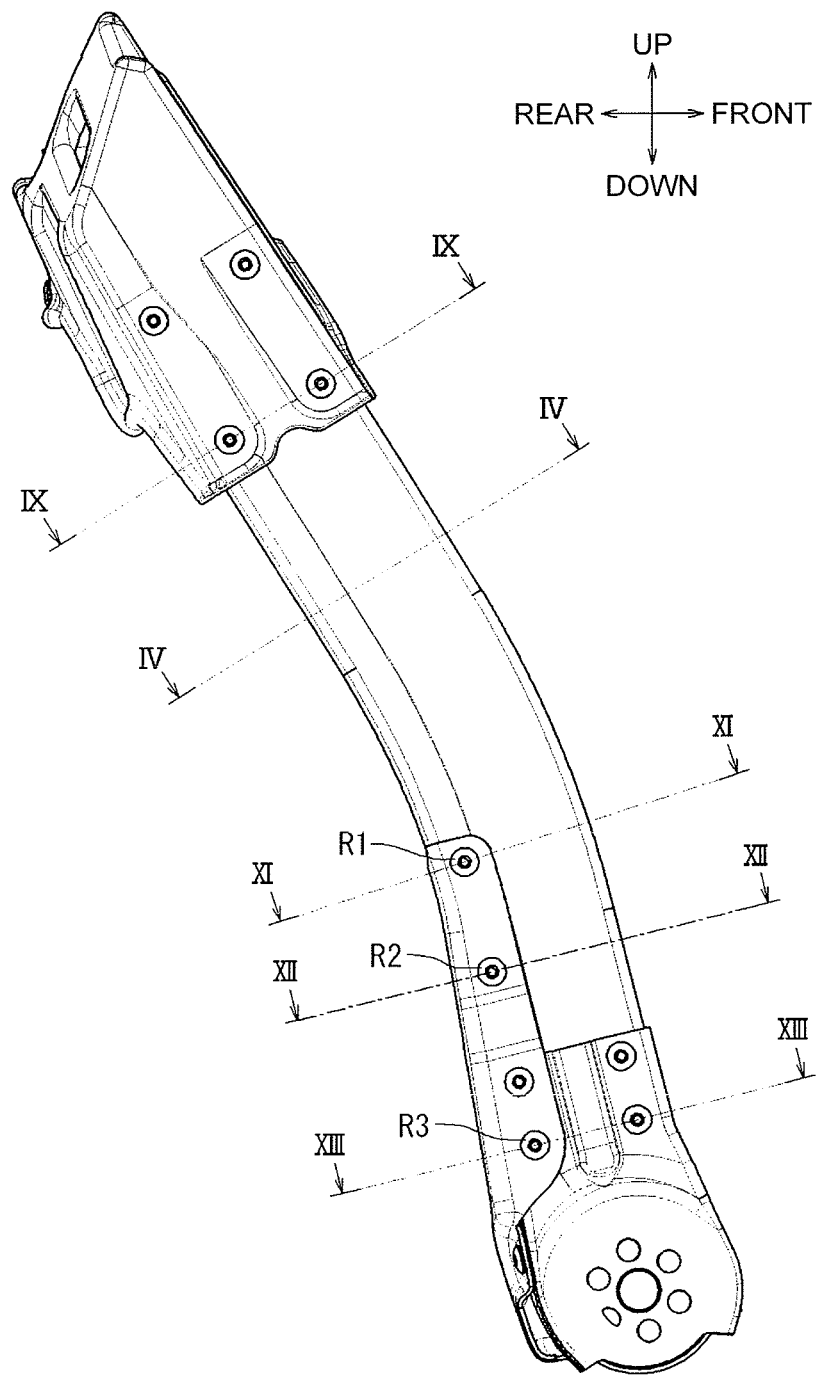
FIG. 3 is a right side view of the back frame of the above embodiment.

As illustrated in FIG. 1 to FIG. 3, a back frame 10 of the present embodiment is a back frame for a right automobile seat with a built-in seat belt, and a webbing winding apparatus (not shown) of a seat belt system can be attached thereto. The back frame 10 includes a right side frame 11 extending in an up-down direction, a left side frame 12 extending in the up-down direction, an upper frame 13 connecting respective upper end sides of the right side frame 11 and the left side frame 12 to each other, and a lower frame 14 connecting their respective lower end sides to each other. Here, the right side frame 11 is an example of a "side frame" or an example of "one side frame", and the left side frame 12 is an example of the "side frame" or an example of "the other side frame".

Figure 4:
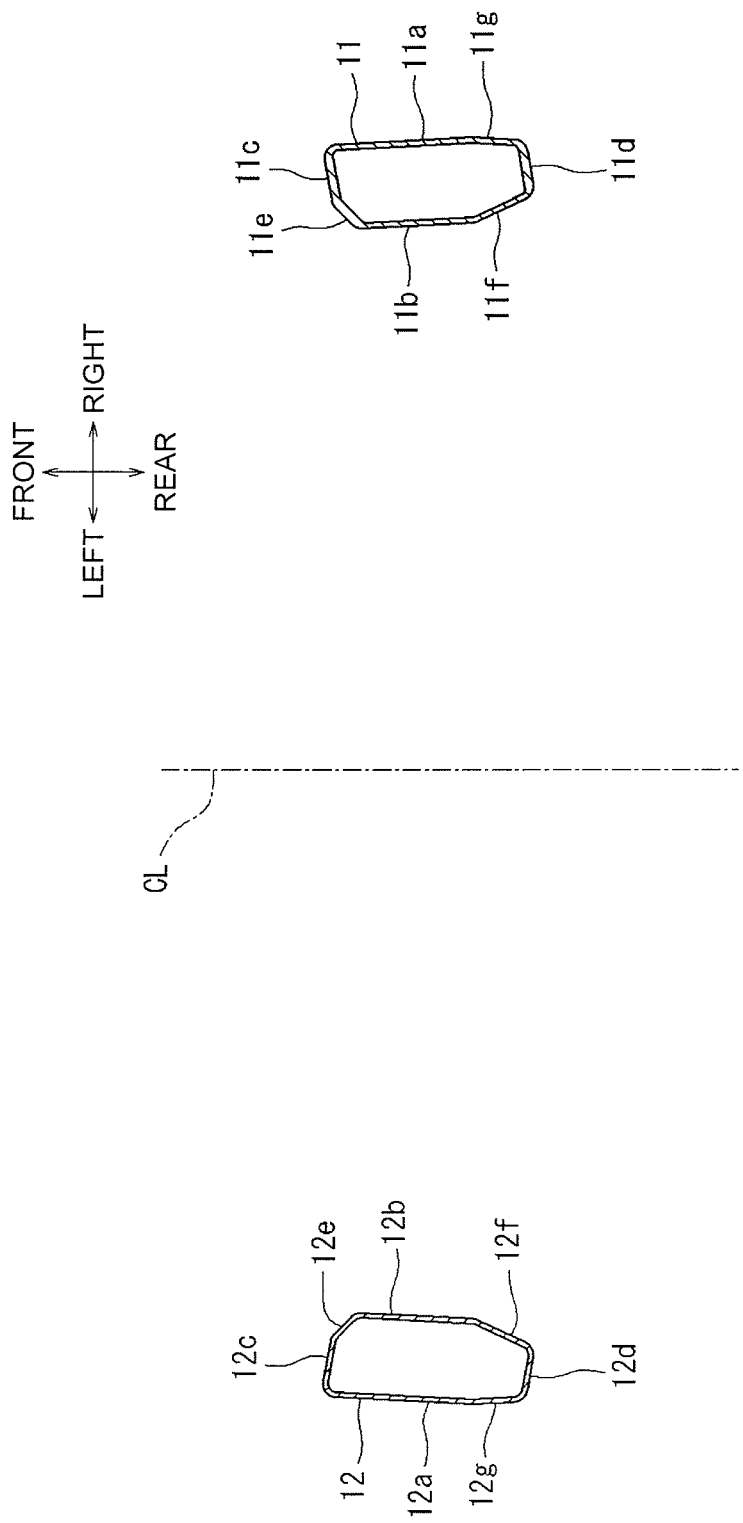
FIG. 4 is a sectional view taken along a line IV-IV in FIG. 3.
Figure 5:
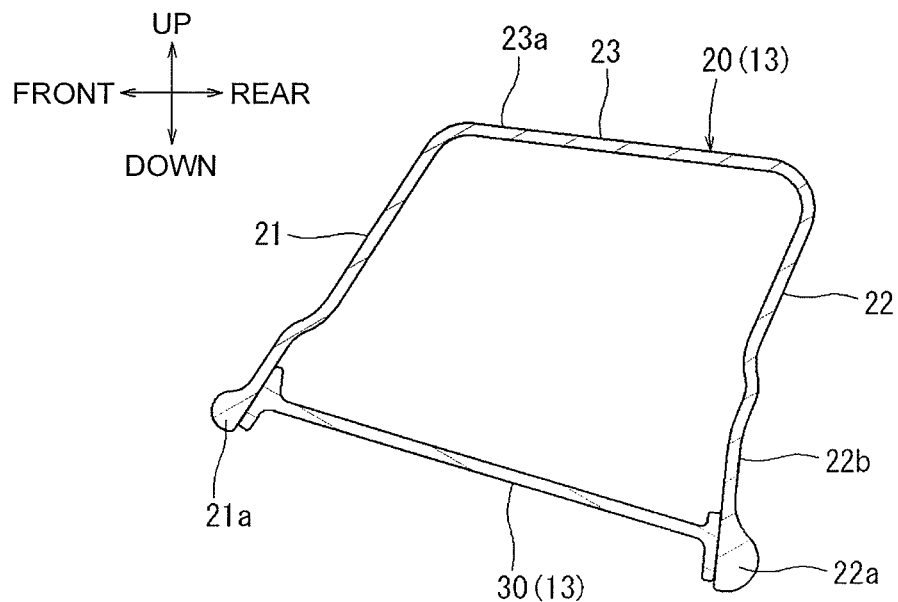
FIG. 5 is a sectional view taken along a line V-V in FIG. 1.
Figure 6:
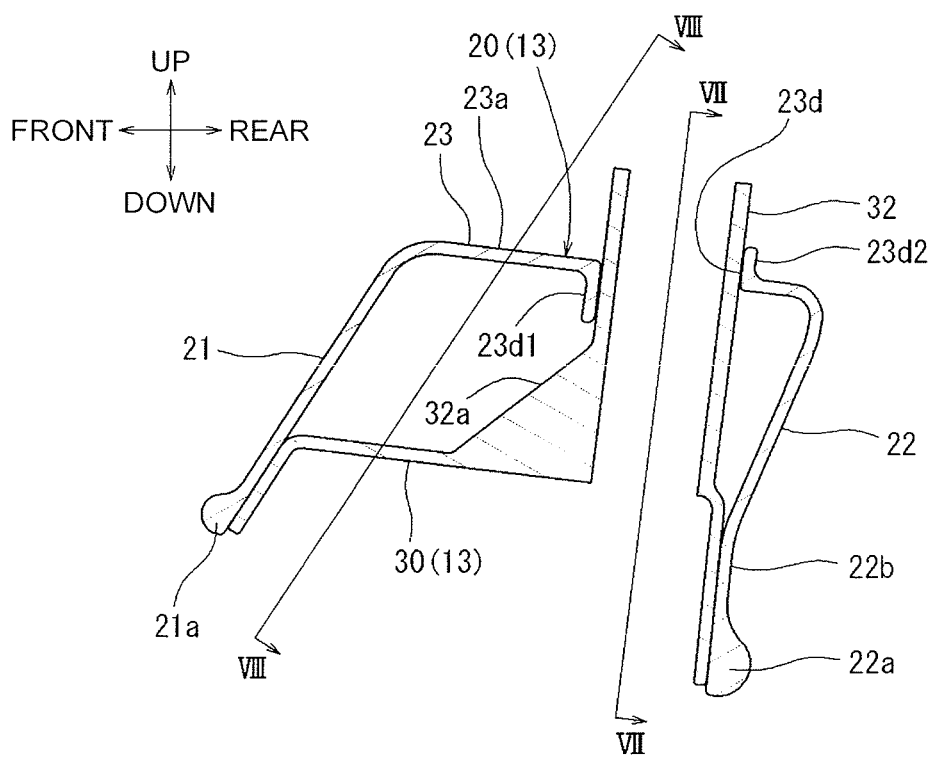
FIG. 6 is a sectional view taken along a line VI-VI in FIG. 1.
Figure 7:
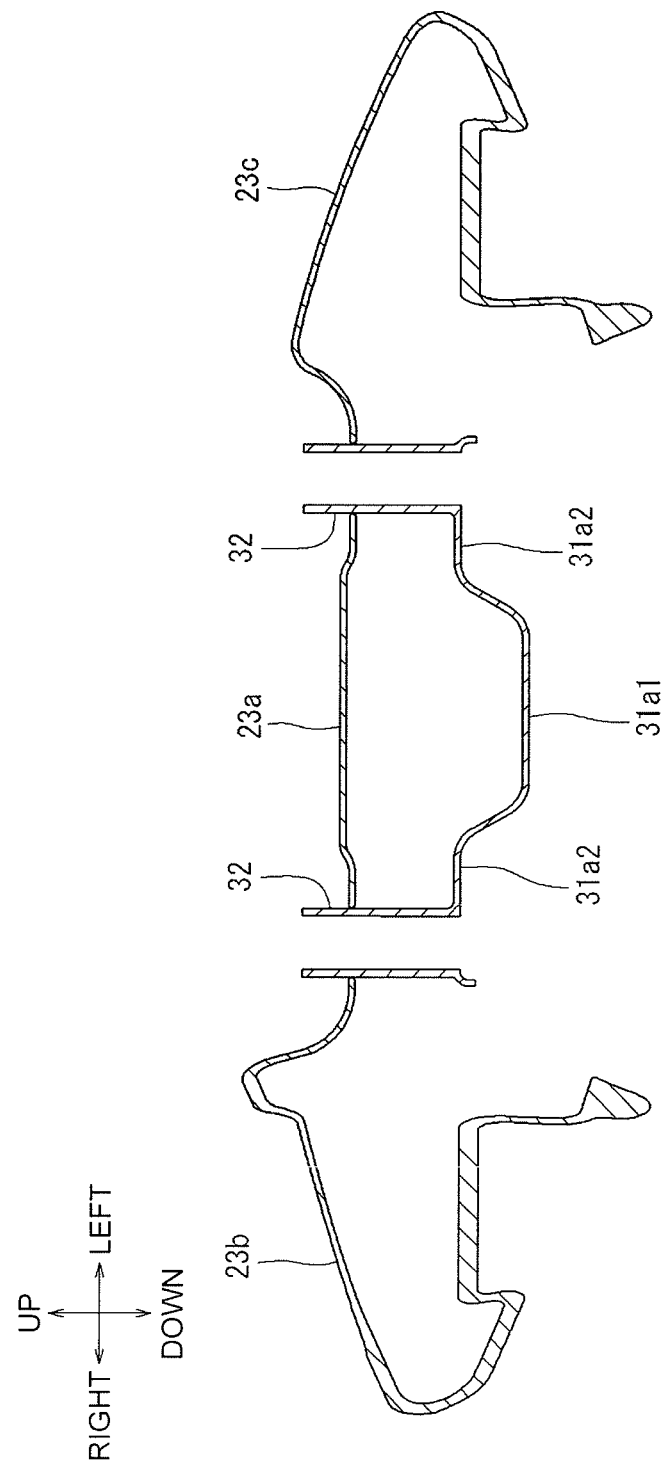
FIG. 7 is a sectional view taken along a line VII-VII in FIG. 6.
Figure 8:
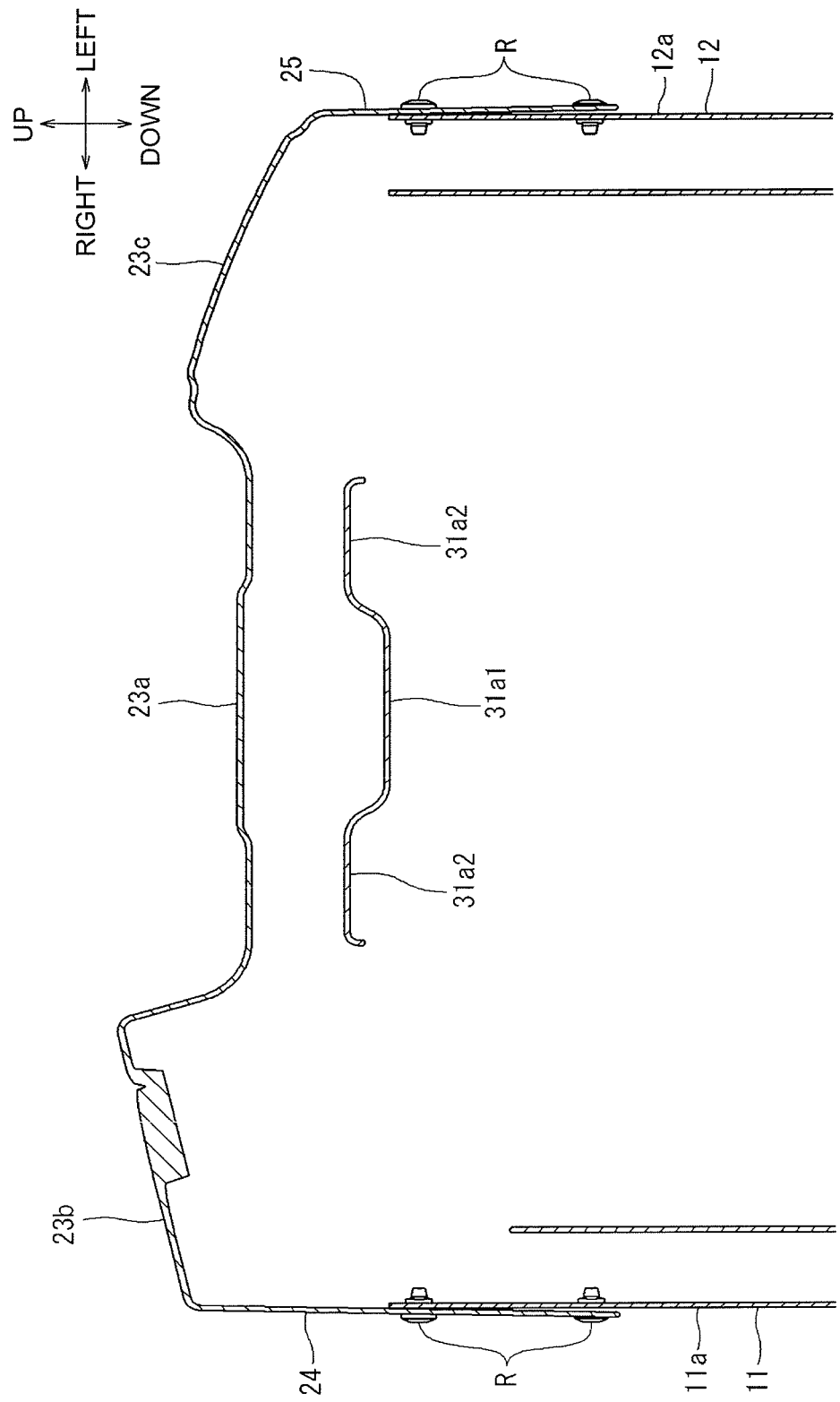
FIG. 8 is a sectional view taken along a line VIII-VIII in FIG. 6.

The right side frame 11 is made of an aluminum-alloy extruded material having a sectional shape as illustrated in FIG. 4 as a base material. In FIG. 4, a cross section of the right side frame 11 has a deformed heptagonal shape, and includes a right side face portion 11a, a left side face portion 11b, a front face portion 11c, a rear face portion 11d, a front left chamfer 11e, a rear left chamfer 11f, and a rear right chamfer 11g. The right side face portion 11a and the left side face portion 11b are inclined slightly to the left (a seat inward direction) from a seat front-rear direction and extend parallel to each other. The front face portion 11c and the rear face portion 11d are inclined slightly rearward relative to a seat right-left direction and extend parallel to each other. The front left chamfer 11e is a part that extends so as to connect a left end of the front face portion 11c to a front end of the left side face portion 11b and has an inclination angle of approximately 45 degrees relative to the left side face portion 11b. The rear left chamfer 11f is a part that extends so as to connect a left end of the rear face portion 11d to a rear end of the left side face portion 11b and has an inclination angle of approximately 30 degrees relative to the left side face portion 11b. The rear right chamfer 11g is a part that extends so as to connect a right end of the rear face portion 11d to a rear end of the right side face portion 11a and has an inclination angle of approximately 5 degrees relative to the right side face portion 11a.

The left side frame 12 is made of an aluminum-alloy extruded material having a sectional shape as illustrated in FIG. 4 as a base material. In FIG. 4, a cross section of the left side frame 12 has a deformed heptagonal shape, and includes a left side face portion 12a, a right side face portion 12b, a front face portion 12c, a rear face portion 12d, a front right chamfer 12e, a rear right chamfer 12f, and a rear left chamfer 12g. The left side face portion 12a and the right side face portion 12b are inclined slightly to the right (a seat inward direction) from a seat front-rear direction and extend parallel to each other. The front face portion 12c and the rear face portion 12d are inclined slightly rearward relative to a seat right-left direction and extend parallel to each other. The front right chamfer 12e is a part that extends so as to connect a right end of the front face portion 12c to a front end of the right side face portion 12b and has an inclination angle of approximately 45 degrees relative to the right side face portion 12b. The rear right chamfer 12f is a part that extends so as to connect a right end of the rear face portion 12d to a rear end of the right side face portion 12b and has an inclination angle of approximately 30 degrees relative to the right side face portion 12b. The rear left chamfer 12g is a part that extends so as to connect a left end of the rear face portion 12d to a rear end of the left side face portion 12a and has an inclination angle of approximately 5 degrees relative to the left side face portion 12a.

As illustrated in FIG. 4, an outline of a cross sectional shape of the right side frame 11 and an outline of a cross sectional shape of the left side frame 12 have a relationship of a linear symmetry with respect to a center line CL of the back frame 10 in the right-left direction. Further, respective thicknesses of the right side face portion 11a and the left side face portion 11b of the right side frame 11 are generally the same as respective thicknesses of the left side face portion 12a and the right side face portion 12b of the left side frame 12. In the meantime, respective thicknesses of the front face portion 11c and the rear face portion 11d of the right side frame 11 are about twice as large as respective thicknesses of the front face portion 12c and the rear face portion 12d of the left side frame 12. The reason is as follows. A webbing guide portion 23b that guides the webbing of the seat belt system is disposed in an upper part of the right side frame 11, and therefore, in order to resist the application of a larger bending load in the front-rear direction to the right side frame 11 than the left side frame 12, the right side frame 11 is formed so that its geometrical-moment of inertia is large. As illustrated in FIG. 1 and FIG. 2, the right side frame 11 and the left side frame 12 are formed by bending the extruded material having a uniform section so that the extruded material has a shape projecting forward near a central part of the extruded material in the up-down direction. Further, an upper arm 15, which is an iron press component, is attached to a lower end side of the right side frame 11. The upper arm 15 is a component formed by combining two components as one component in a sandwich state. An upper part of the upper arm 15 is formed as a side frame connection portion 15a such that an inner shape line of a horizontal section of the upper part of the upper arm 15 corresponds to the outline of the cross sectional shape of the right side frame 11. Further, a lower part of the upper arm 15 is formed as a flat-shaped recliner connection portion 15b. The lower part of the upper arm 15 is provided with recliner communicating holes 15b1. In a state where the lower end side of the right side frame 11 is inserted into the side frame connection portion 15a of the upper arm 15, the lower end side of the right side frame 11 is connected to the side frame connection portion 15a with four rivets R being fastened. A recliner connection portion 12h is formed in the lower end side of the left side frame 12 such that the front face portion 12c is expanded forward and recliner communicating holes 12a1 are formed in the recliner connection portion 12h. A recliner is attached to the left side face portion 12a via the recliner communicating holes 12a1. Here, the side frame connection portion 15a is an example of an "engageable portion".

Figure 10:
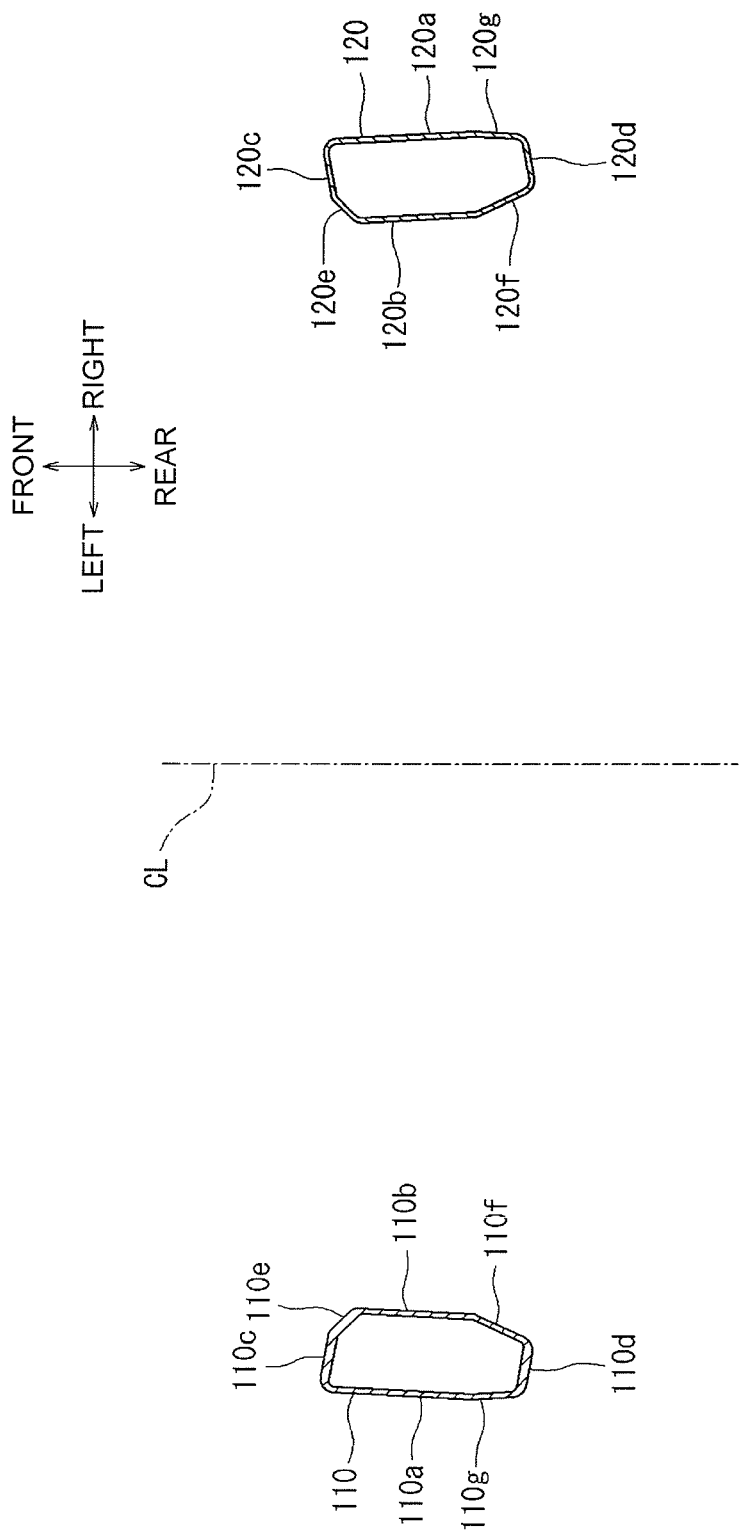
FIG. 10 is an end elevational view of a back frame for a left automobile seat, corresponding to FIG. 4.

FIG. 10 illustrates sectional shapes of a right side frame 120 and a left side frame 110 of a left automobile seat, corresponding to FIG. 4. The sectional shapes in FIG. 10 are in such a relationship that right and left in the sectional shapes in FIG. 4 are replaced with each other across a center line CL in the right-left direction. That is, respective face portions 11a to 11f of the right side frame 11 of the right automobile seat correspond to respective face portions 110a to 110f of the left side frame 110 of the left automobile seat. Further, respective face portions 12a to 12f of the left side frame 12 of the right automobile seat correspond to respective face portions 120a to 120f of the right side frame 120 of the left automobile seat. Hereby, the right side frame 11 and the left side frame 110 can be formed by using aluminum-alloy extruded materials that have the same section and the aluminum-alloy extruded materials are set upside-down to each other when being used for forming the right side frame 11 and the left side frame 110. Further, the left side frame 12 and the right side frame 120 can be formed by using aluminum-alloy extruded materials that have the same section and the aluminum-alloy extruded materials are set upside-down to each other when being used for forming the left side frame 12 and the right side frame 120. That is, the side frames for the right and left automobile seats can be formed by using two types of aluminum-alloy extruded materials. Note that, in the left automobile seat, the right side frame 120 is an example of the "side frame" or an example of "the other side frame", and the left side frame 110 is an example of the "side frame" or an example of "one side frame".

As illustrated in FIG. 1, FIG. 2 and FIG. 5 to FIG. 8, the upper frame 13 includes a body portion 20 having a generally reverse U-shaped cross section and the body portion 20 is opened downward. The upper frame 13 also includes a cover member 30 attached to a central part on a lower side of the opening of the body portion 20 so as to cover the opening of the body portion 20. The body portion 20 is a fiber-reinforced composite molded product which is obtained by laminating a plurality of carbon fiber cloths and hardening the laminated carbon fiber cloths with matrix resin of epoxy resin. The body portion 20 includes a front wall portion 21, a rear wall portion 22, an upper wall portion 23, a right wall portion 24, and a left wall portion 25.

The upper wall portion 23 includes a central portion 23a positioned in the center of the upper wall portion 23 in the right-left direction. The upper wall portion 23 also includes the webbing guide portion 23b positioned on a right end side, and a pedestal portion 23c positioned on a left end side. The central portion 23a is a face portion extending in a generally horizontal direction in a standard state where the back frame 10 rises relative to the rear part of a cushion frame. The generally horizontal direction is a direction generally perpendicular to the after-mentioned holder portion 32. A pair of holder insertion holes 23d are formed in the central portion 23a at symmetric positions in terms of a center plane in the right-left direction and the holder insertion holes 23d penetrate the central portion 23a in the up-down direction. In a peripheral portion of the holder insertion hole 23d, a front upright wall portion 23d1 mainly supporting a front face portion side of the holder portion 32 is provided so as to stand downward, and a rear upright wall portion 23d2 mainly supporting a rear face portion side of the holder portion 32 is provided so as to stand upward. More specifically, the front upright wall portion 23d1 is disposed generally in a U-shape from a front edge part of the peripheral portion of the holder insertion hole 23d to both side parts thereof in a plan view, and the rear upright wall portion 23d2 is disposed generally in a U-shape from a rear edge part of the peripheral portion of the holder insertion hole 23d to both side parts thereof in a plan view. The webbing guide portion 23b is a mound-shaped part protruding upward and the mound-shaped part has an edge line inclined toward a right downward side in the right-left direction. The webbing guide portion 23b has a function to guide the webbing (not shown) of the seat belt system from a back face of the back frame 10 toward a front face of an upper body of the sitting occupant. The webbing is let out from the webbing winding apparatus (not shown) disposed inside the seatback. The pedestal portion 23c is a table-shape part protruding slightly upward relative to the central portion 23a, and is intended to form the shape of a shoulder of the seatback. Whether the webbing guide portion 23b is formed on the right side or on the left side can be selected by attaching a nest portion (not shown) on the right side or on the left side in a molding die for the upper frame 13, and whether the pedestal portion 23c is formed on the right side or on the left side also can be selected by detaching the nest portion (not shown) from the right side or from the left side in the molding die for the upper frame 13. That is, a part which is molded by attaching the nest portion (not shown) to the molding die for the upper frame 13 serves as the pedestal portion 23c, and a part which is molded without attaching the nest portion serves as the webbing guide portion 23b. In the body portion 20 of the left automobile seat, the webbing guide portion 23b is placed on the left end portion side and the pedestal portion 23c is placed on the right end portion side. That is, the webbing guide portion 23b is placed on a vehicle outer side in either case of the right seat and the left seat.

The front wall portion 21 extends toward the forward lower side, making an obtuse angle relative to the central portion 23a of the upper wall portion 23. Further, when the upper frame 13 is connected to the right side frame 11 and the left side frame 12, the front wall portion 21 extends so as to be generally parallel to the front face portion 11c and the front face portion 12c in upper parts of the right side frame 11 and the left side frame 12. A thickened part 21a to increase the rigidity of an end portion is provided in a lower end of the front wall portion 21. When the upper frame 13 is connected to the right side frame 11 and the left side frame 12, the rear wall portion 22 extends so as to be generally parallel to the rear face portion 11d and the rear face portion 12d in the upper parts of the right side frame 11 and the left side frame 12. That is, the front wall portion 21 and the rear wall portion 22 extend toward the forward lower side and substantially parallel to each other. In the rear wall portion 22, a part corresponding to the central portion 23a of the upper wall portion 23 is configured such that its lower part extends downward and extends generally perpendicularly to the upper wall portion 23, and a connecting face portion 22b is formed. The after-mentioned rear wall face portion 31c of the cover member 30 is connected to the connecting face portion 22b. A thickened part 22a to increase the rigidity of the end portion is provided in a lower end of the rear wall portion 22. A right end of the upper wall portion 23, a right end of the front wall portion 21, and a right end of the rear wall portion 22 are connected together via the right wall portion 24, and a left end of the upper wall portion 23, a left end of the front wall portion 21, and a left end of the rear wall portion 22 are connected together via the left wall portion 25. The upper wall portion 23, the front wall portion 21, the rear wall portion 22, the right wall portion 24, and the left wall portion 25 are formed as the body portion 20 having a generally box shape that is opened downward.

Figure 9:
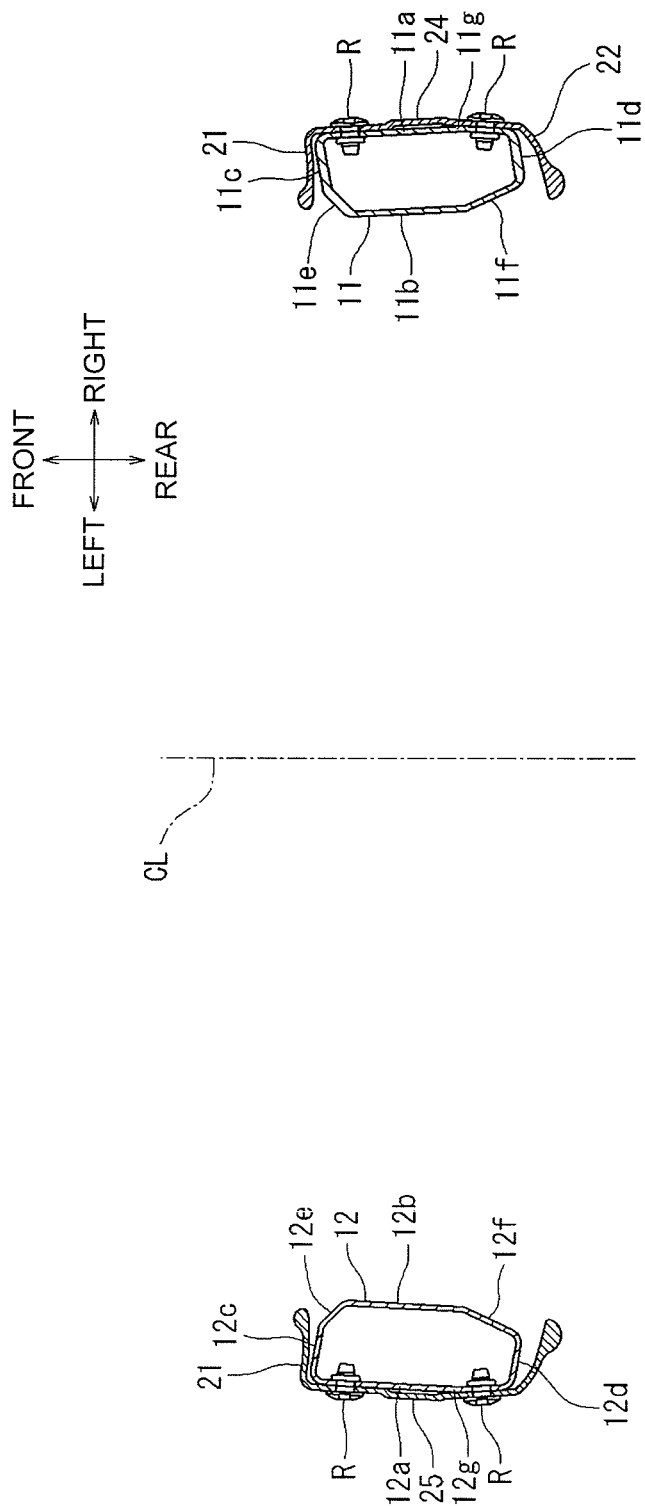
FIG. 9 is a sectional view taken along a line IX-IX in FIG. 3.

As illustrated in FIG. 9, when the upper frame 13 is placed to cover the upper end side of the right side frame 11 and the upper end side of the left side frame 12 from the upper side, a left side surface of the right wall portion 24 is formed so as to abut with a right side surface of the right side face portion 11a of the right side frame 11 and a right side surface of the rear right chamfer 11g of the right side frame 11. Further, when the upper frame 13 is placed to cover the upper end side of the right side frame 11 and the upper end side of the left side frame 12 from the upper side, a right side surface of the left wall portion 25 is formed so as to abut with a left side surface of the left side face portion 12a of the left side frame 12 and a left side surface of the rear left chamfer 12g of the left side frame 12. Note that, with reference to FIG. 10, the left side surface of the right wall portion 24 can abut with a right side surface of the right side face portion 120a of the right side frame 120 for the left automobile seat and a right side surface of the rear right chamfer 120g of the right side frame 120 for the left automobile seat. Also, the right side surface of the left wall portion 25 can abut with a left side surface of the left side face portion 110a of the left side frame 110 for the left automobile seat and a left side surface of the rear left chamfer 110g of the left side frame 110 for the left automobile seat.

As illustrated in FIG. 2 and FIG. 5 to FIG. 8, the cover member 30 is a die-cast molded product of aluminum. The cover member 30 includes a base portion 31 which has a generally rectangular shape in a plan view. The cover member 30 also includes a pair of holder portions 32 which are provided in a standing manner on rear sides of right and left ends of the base portion 31 and either of the holder portions 32 has a shape of square tube. The base portion 31 includes an upper wall face portion 31a, a front wall face portion 31b, and a rear wall face portion 31c. The upper wall face portion 31a is provided with a recessed face portion 31a1 in its central part in the right-left direction. The upper wall face portion 31a is also provided with projection face portions 31a2 which protrude in a table shape and are provided on both right and left sides of the recessed face portion 31a1. The holder portion 32 is provided in a standing manner on the rear side of the projecting face portion 31a2, and an inner cylinder part of the holder portion 32 is formed in a penetrating manner in the up-down direction, so that a headrest support 40 can be inserted therein. A diagonal-bracing wall 32a, which is provided to stably hold the holder portion 32 relative to the projecting face portion 31a2, is provided between a front face portion of the holder portion 32 and the projecting face portion 31a2.

As illustrated in FIG. 2 and FIG. 5 to FIG. 8, the cover member 30 is assembled to the body portion 20 in a state where respective upper end sides of the pair of holder portions 32 are inserted into the pair of holder insertion holes 23d of the body portion 20 from the lower side. More specifically, in a state where about ⅓ of a vertical length of the holder portion 32 from its upper end is exposed from a top face of the central portion 23a, the lower end side of the front wall portion 21 of the body portion 20 is brought into contact with the front wall face portion 31b of the cover member 30, and the front wall face portion 31b is fixed to the front wall portion 21 with two rivets R being fastened. Further, in the same state, the connecting face portion 22b of the rear wall portion 22 of the body portion 20 is brought into contact with the rear wall face portion 31c of the cover member 30, and the rear wall face portion 31c is fixed to the rear wall portion 22 with two rivets R being fastened. Hereby, the cover member 30 is fixed to the front wall portion 21 and the rear wall portion 22 corresponding to the central portion 23a of the upper wall portion 23 of the body portion 20, so as to form a closed-section structure in that part. At this time, the pair of holder portions 32 of the cover member 30 are mainly supported from the front side and the rear side respectively by the front upright wall portion 23d1 and the rear upright wall portion 23d2 of the body portion 20.

As illustrated in FIG. 1 to FIG. 3 and FIG. 11 to FIG. 13, the lower frame 14 has a generally U-shape in a front view and is a fiber-reinforced composite molded product obtained such that a plurality of carbon fiber cloths is laminated and hardened by matrix resin of epoxy resin. The lower frame 14 includes a main portion 14a, a right connection portion 14b disposed on the right side of the main portion 14a and serving as a connection portion with the lower end side of the right side frame 11 and the upper arm 15, and a left connection portion 14c serving as a connection portion with the lower end side of the left side frame 12. A rib (not shown) is provided in the main portion 14a so that its rigidity is raised. The main portion 14a includes a lower end 14a1 extending in the right-left direction so as to connect a lower end of the right side frame 11 to a lower end of the left side frame 12, and an upper end 14a2 extending in a suspended line shape in the right-left direction so as to connect a slightly lower part of the right side frame 11 than a central part thereof in the up-down direction to a slightly lower part of the left side frame 12 than a central part thereof in the up-down direction. That is, the main portion 14a is formed such that a height from the lower end 14a1 is low at the central part in the right-left direction and the height gradually increases toward the right connection portion 14b and the left connection portion 14c. The right connection portion 14b is formed in a generally U-shape such that its section cut along a horizontal plane is opened forward, and includes a right face portion 14b1, a rear face portion 14b2, and a left face portion 14b3 corresponding to the rear right chamfer 11g, the rear face portion 11d, and the rear left chamfer 11f of the right side frame 11, respectively. The left connection portion 14c is formed in a generally U-shape such that its section cut along a horizontal plane is opened forward, and includes a left face portion 14c1, a rear face portion 14c2, and a right face portion 14c3 corresponding to the rear left chamfer 12g, the rear face portion 12d, and the rear right chamfer 12f of the left side frame 12, respectively. Further, with reference to FIG. 10, in the back frame 10 for the left automobile seat, the right face portion 14b1, the rear face portion 14b2, and the left face portion 14b3 correspond to the rear right chamfer 120g, the rear face portion 120d, and the rear left chamfer 120f of the right side frame 120, respectively. Further, the left face portion 14c1, the rear face portion 14c2, and the right face portion 14c3 correspond to the rear left chamfer 110g, the rear face portion 110d, and the rear right chamfer 110f of the left side frame 110, respectively. That is, the lower frame 14 is also usable both for the back frame 10 of the right automobile seat and for the back frame 10 of the left automobile seat. Here, the right connection portion 14b and the left connection portion 14c are an example of "one connection portion" and an example of "the other connection portion" respectively. Further, a section opened forward and obtained by cutting the right connection portion 14b along a horizontal plane, and a section opened forward and obtained by cutting the left connection portion 14c along a horizontal plane is an example of a "front open section".

Figure 11:
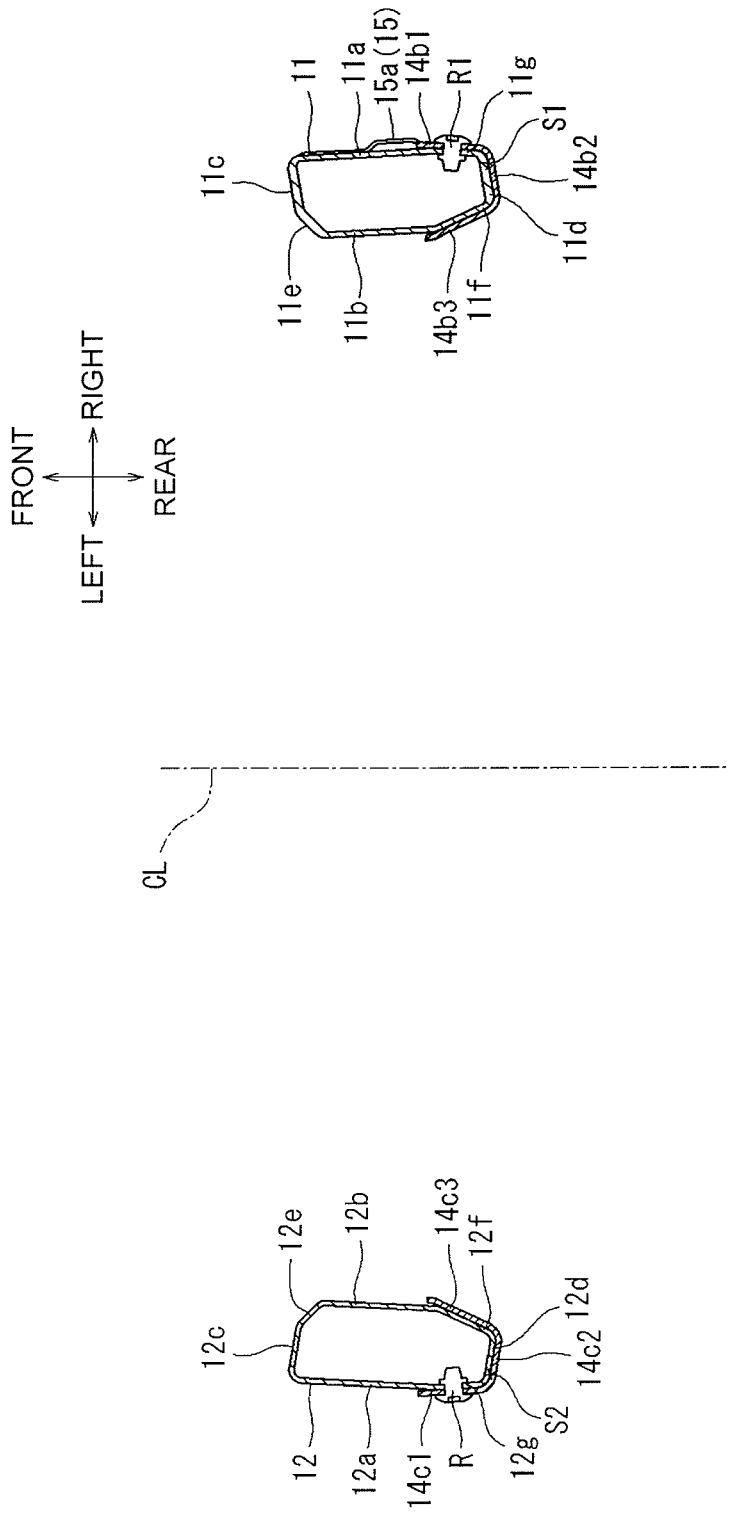
FIG. 11 is a sectional view taken along a line XI-XI in FIG. 3.
Figure 12:
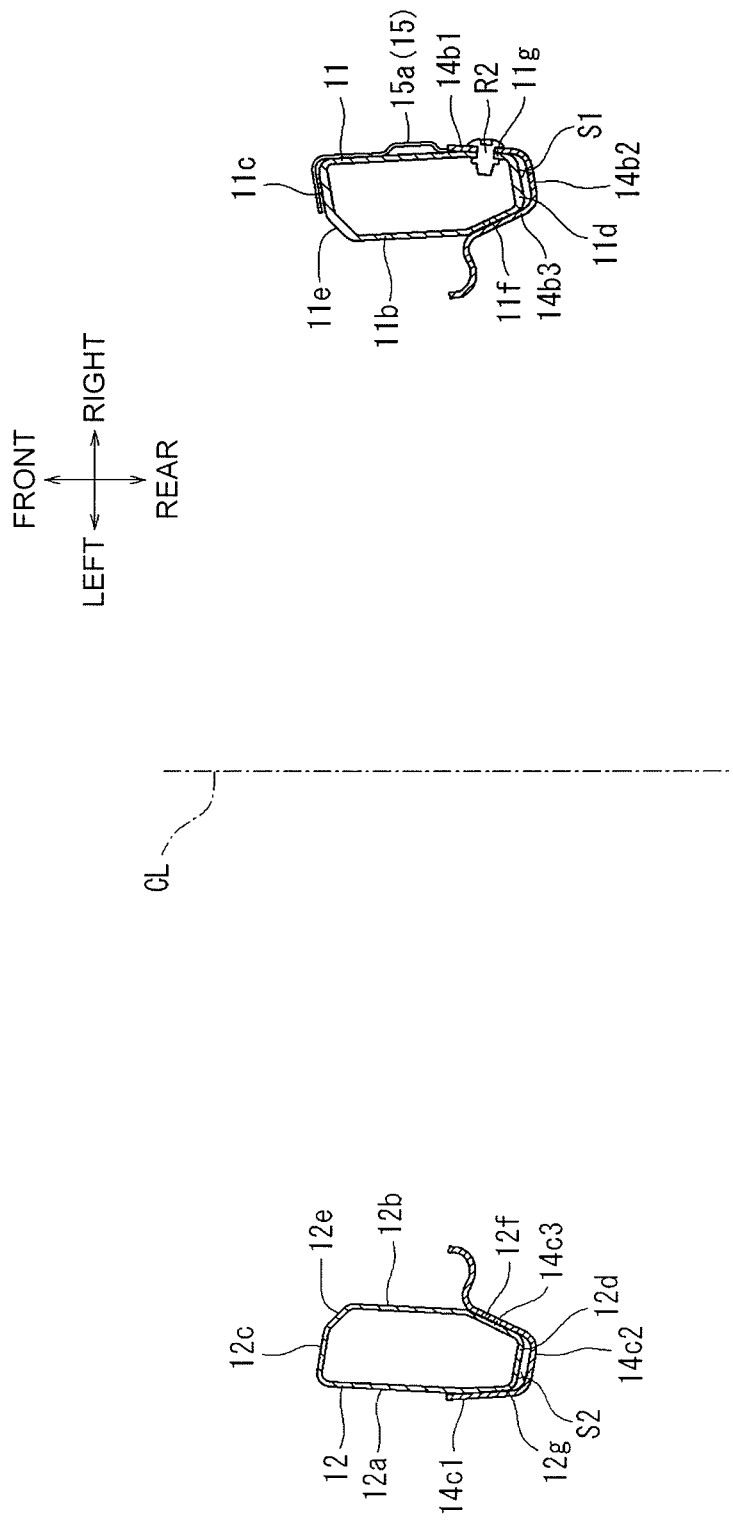
FIG. 12 is a sectional view taken along a line XII-XII in FIG. 3.
Figure 13:
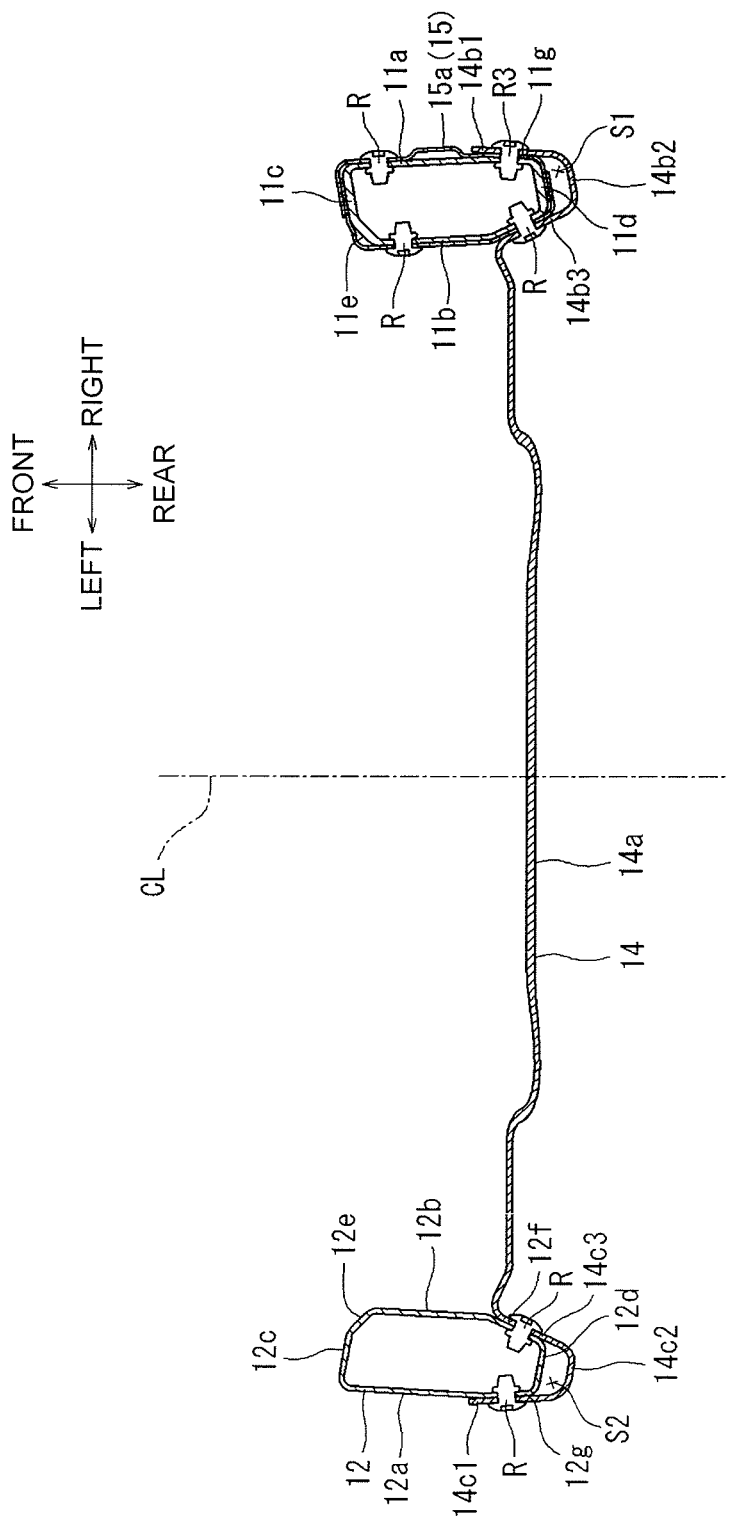
FIG. 13 is a sectional view taken along a line XIII-XIII in FIG. 3.

As illustrated in FIG. 1, FIG. 2, FIG. 4 and FIG. 8, the upper frame 13 is placed to cover the upper end side of the right side frame 11 and the upper end side of the left side frame 12 from the upper side. In this state, the right wall portion 24 is brought into contact with the right side face portion 11a of the right side frame 11 and the rear right chamfer 11g of the right side frame 11, and the right wall portion 24 is fixed to the right side face portion 11a and the rear right chamfer 11g with four rivets R being fastened. Also, the left wall portion 25 of the upper frame 13 is brought into contact with the left side face portion 12a of the left side frame 12 and the rear left chamfer 12g of the left side frame 12, and the left wall portion 25 is fixed to the left side face portion 12a and the rear left chamfer 12g with four rivets R being fastened. Subsequently, in a state where the upper arm 15 is attached to the lower end side of the right side frame 11, the right connection portion 14b of the lower frame 14 is placed to cover the lower end side of the right side frame 11 from the rear side, such that the rear right chamfer 11g of the right side frame 11 is brought into contact with the right face portion 14b1 of the lower frame 14 so as to be fixed thereto with four rivets R being fastened. Further, in the same state, the rear left chamfer 11f of the right side frame 11 is brought into contact with the left face portion 14b3 of the lower frame 14 so as to be fixed thereto with three rivets R being fastened. Here, FIG. 11 is a section cut at a part corresponding to a rivet R1, which is the uppermost one, FIG. 12 is a section cut at a part corresponding to a rivet R2, which is the second uppermost one, and FIG. 13 is a section cut at a part corresponding to a rivet R3, which is the bottommost one. A space S1 between a front surface of a rear face portion 14b2 of the lower frame 14 and a rear surface of the rear face portion 11d of the right side frame 11 becomes larger as it goes downward. Accordingly, in terms of a section cut along a horizontal plane and formed by the right side frame 11 and the right connection portion 14b of the lower frame 14, a geometrical-moment of inertia of this section cut along an axis extending in the right-left direction increases toward a lower side, so that the bending rigidity of the right side frame 11 in the front-rear direction increases. As illustrated in FIG. 11 to FIG. 13, a section is obtained by cutting along a horizontal plane in a state where the upper arm 15 is attached to the lower end side of the right side frame 11 and the right connection portion 14b of the lower frame 14 is placed to cover them from the rear side, and this section is an example of a "fitting section".

Subsequently, the left connection portion 14c of the lower frame 14 is placed to cover the lower end side of the left side frame 12 from the rear side, such that the rear left chamfer 12g of the left side frame 12 is brought into contact with the left face portion 14c1 of the lower frame 14 so as to be fixed thereto with three rivets R being fastened. Further, in the same state, the rear right chamfer 12f of the left side frame 12 is brought into contact with the right face portion 14c3 of the lower frame 14 so as to be fixed thereto with three rivets R being fastened. Here, as illustrated in FIG. 11 to FIG. 13, a space S2 between a front surface of the rear face portion 14c2 of the lower frame 14 and a rear surface of the rear face portion 12d of the left side frame 12 becomes larger as it goes downward. Accordingly, in terms of a section cut along a horizontal plane and formed by the left side frame 12 and the left connection portion 14c of the lower frame 14, a geometrical-moment of inertia of this section cut along an axis extending in the right-left direction increases toward the lower side, so that the bending rigidity of the left side frame 12 in the front-rear direction increases. As illustrated in FIG. 1 and FIG. 11 to FIG. 13, a section is obtained by cutting along a horizontal plane in a state where the left connection portion 14c of the lower frame 14 is placed to cover the lower end side of the left side frame 12 from the rear side, and this section is an example of a "fitting section". Thereby, the left side frame 12, the right side frame 11, the upper frame 13, and the lower frame 14 are connected to each other, so that the back frame 10 having a generally rectangular in a front view is formed. Note that, in the back frame 10, the recliner connection portion 15b of the upper arm 15 and the recliner connection portion 12h of the left side frame 12 are attached to a rear end side of a seat cushion frame (not shown) via respective recliners (not shown).

The present embodiment thus configured has the following effects. The lower end side of the right side frame 11 is connected to the right connection portion 14b of the lower frame 14 and the lower end side of the left side frame 12 is connected to the left connection portion 14c of the lower frame 14. Here, the right face portion 14b1, the rear face portion 14b2, and the left face portion 14b3 of the lower frame 14 are placed to cover the rear right chamfer 11g, the rear face portion 11d, and the rear left chamfer 11f from an outer side in the cross section of the right side frame 11, so as to be connected thereto. At this time, a length in the front-rear direction of the space S1 formed between the rear face of the rear face portion 11d of the right side frame 11 and the front face of the rear face portion 14b2 of the lower frame 14 increases toward the lower side. Accordingly, in a part where the right side frame 11 is connected to the right connection portion 14b of the lower frame 14, the geometrical-moment of inertia along the axis extending in the right-left direction gradually increases from an upper part to a lower part of the right side frame 11 integrally with the lower frame 14. That is, it is possible to increase the bending rigidity of the right side frame 11 in the front-rear direction by connecting the lower frame 14 to the right side frame 11. The relationship between the left side frame 12 and the left connection portion 14c of the lower frame 14 is the same as the relationship between the right side frame 11 and the right connection portion 14b of the lower frame 14.

Further, the main portion 14a of the lower frame 14 is formed such that the height from the lower end 14a1 is low at the central part in the right-left direction and the height gradually increases toward the right connection portion 14b and the left connection portion 14c. Accordingly, a part of the right side frame 11 is connected to the right connection portion 14b of the lower frame 14, and a geometrical-moment of inertia of the lower frame 14 along an axis extending in the front-rear direction gradually increases downward from an upper end of this part of the right side frame 11. That is, the bending rigidity of the right side frame 11 in the right-left direction can be increased while the size of the lower frame 14 is made small. The relationship between the left side frame 12 and the left connection portion 14c of the lower frame 14 is the same as the relationship between the right side frame 11 and the right connection portion 14b of the lower frame 14.

Further, the right connection portion 14b of the lower frame 14 is disposed over the right side frame 11 and the upper arm 15. This makes it possible to achieve a continuous change of the geometrical-moment of inertia between the high-rigidity upper arm 15 and the right side frame 11 by relaxing a discontinuous change in the geometrical-moment of inertia thereof. This accordingly makes it possible to increase the bending rigidity while avoiding a local concentration of stress at the time when a force in the front-rear direction is applied to the back frame 10.

A specific embodiment has been described above, but the embodiment is not limited to the appearance and the configuration thereof, and various modifications, additions, and deletions are performable as far as they do not change a gist of the disclosure. For example, the following modifications are included.

In the above embodiment, the right side frame 11, the left side frame 12, and the upper frame 13 are independent members. Alternatively, the left side frame 12 and the upper frame 13 may be formed integrally, and the right side frame 11 and the upper frame 13 may be formed integrally. Furthermore, the right side frame 11, the upper frame 13, and the left side frame 12 may be formed integrally.

In the above embodiment, the right side frame 11 and the left side frame 12 are made of the aluminum-alloy extruded material. Alternatively, they may be made of magnesium alloy or the like light metal, or may be made of iron. Furthermore, they may be made of fiber reinforced composite resin. Further, in the above embodiment, the lower frame 14 is a product made of fiber reinforced composite resin. Alternatively, the lower frame 14 may be a press molded product of a metal plate material.

In the above embodiment, the disclosure is applied to a seat for an automobile, but may be applied to seats to be provided in an airplane, a ship, a train, and the like.

What is claimed is:

1. A back frame structure for a vehicle seat, comprising:
a pair of side frames comprising a right side frame and a left side frame extending in an up-down direction; and
a lower frame configured to connect a lower end side of the right side frame and a lower end side of the left side frame, wherein:
at least one side frame out of the pair of side frames is fitted to one connection portion, which is a connection portion of the lower frame with respect to the one side frame, so as to form one fitting portion;
the one fitting portion is configured such that a geometrical-moment of inertia of the at least one side frame along an axis extending in a predetermined first direction gradually increases from an upper part of the one fitting portion to a lower part of the one fitting portion;
the one fitting portion defines a space between the at least one side frame and the lower frame; and
a cross section of the space increases toward the lower part of the one fitting portion.

2. The back frame structure according to claim 1, wherein the first direction is a right-left direction.

3. The back frame structure according to claim 2, wherein:
a length of an outline of one fitting section in a front-rear direction gradually increases from the upper part of the one fitting portion to the lower part of the one fitting portion; and
the one fitting section is a section obtained by cutting the one fitting portion along a horizontal plane.

4. The back frame structure according to claim 1, wherein:
the one fitting portion is configured such that a geometrical-moment of inertia of the at least one side frame along an axis extending in a second direction gradually increases from the upper part of the one fitting portion to the lower part of the one fitting portion; and the second direction is a direction perpendicular to the first direction.

5. The back frame structure according to claim 4, wherein the second direction is a front-rear direction.

6. The back frame structure according to claim 5, wherein a height of the lower frame in the up-down direction gradually decreases from the one connection portion toward a central part of the back frame in a right-left direction.

7. The back frame structure according to claim 4, wherein:
another side frame out of the pair of side frames is fitted to another connection portion, which is a connection portion of the lower frame with respect to the other side frame, so as to form another fitting portion;
the other fitting portion is configured such that a geometrical-moment of inertia of the other side frame along an axis extending in a third direction gradually increases from an upper part of the other fitting portion to a lower part of the other fitting portion;
the other fitting portion is configured such that a geometrical-moment of inertia of the other side frame along an axis extending in a fourth direction gradually increases from the upper part of the other fitting portion to the lower part of the other fitting portion;
the third direction and the first direction are symmetric about an axis extending in a front-rear direction of the back frame; and
the fourth direction is a direction perpendicular to the third direction.

8. The back frame structure according to claim 7, wherein:
cross sections of the one side frame and the other side frame are uniform closed sections or rear open sections having a generally U-shape that is opened rearward;
the one connection portion and the other connection portion of the lower frame have front open sections having a generally U-shape that is opened forward;
the front open sections form the one fitting portion and the other fitting portion with respect to the closed sections or the rear open sections over a predetermined length in the up-down direction;
a length of an outline of one fitting section gradually increases from the upper part of the one fitting portion to the lower part of the one fitting portion and a length of an outline of another fitting section gradually increases from the upper part of the other fitting portion to the lower part of the other fitting portion;
the one fitting section is a section obtained by cutting the one fitting portion along a horizontal plane;
the other fitting section is a section obtained by cutting the other fitting portion along a horizontal plane; and
a height of the lower frame in the up-down direction gradually decreases from the one connection portion and the other connection portion toward a central part of the back frame in a right-left direction.

9. The back frame structure according to claim 1, wherein:
a cross section of the one side frame is a uniform closed section or a rear open section having a generally U-shape that is opened rearward;
the one connection portion of the lower frame has a front open section having a generally U-shape that is opened forward; and
the front open section is fitted to the closed section or the rear open section over a predetermined length in the up-down direction, so as to form the one fitting portion.

10. The back frame structure according to claim 1, wherein
an upper arm having a rigidity higher than that of the one side frame is attached to a lower end of the one side frame; and
the one connection portion of the lower frame is disposed over the one side frame and the upper arm.

11. The back frame structure according to claim 10, wherein:
another upper arm having a rigidity higher than that of another side frame is also attached to a lower end of the other side frame; and
another connection portion, which is a connection portion of the lower frame with respect to the other side frame, is also disposed over the other side frame and the other upper arm.

12. The back frame structure according to claim 1, wherein:
an upper arm having a rigidity higher than that of another side frame is attached to a lower end of the other side frame; and
another connection portion, which is a connection portion of the lower frame with respect to the other side frame, is disposed over the other side frame and the upper arm.

* * * * *